June 9, 1925. 1,541,549
C. P. WINEMAN ET AL
AUTOMATIC DRILL MILLING MACHINE
Filed March 29, 1922  6 Sheets-Sheet 1
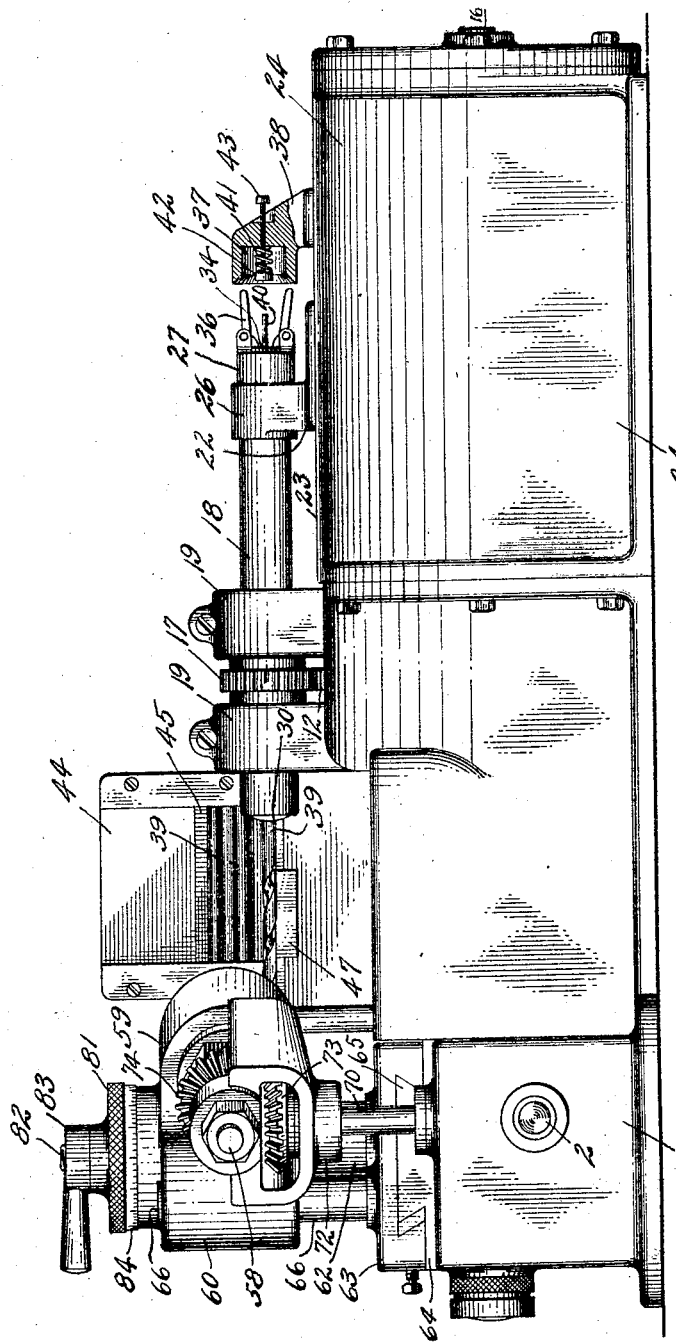
Inventor
Charles P. Wineman.
William G. Calkins.
By
Attorneys

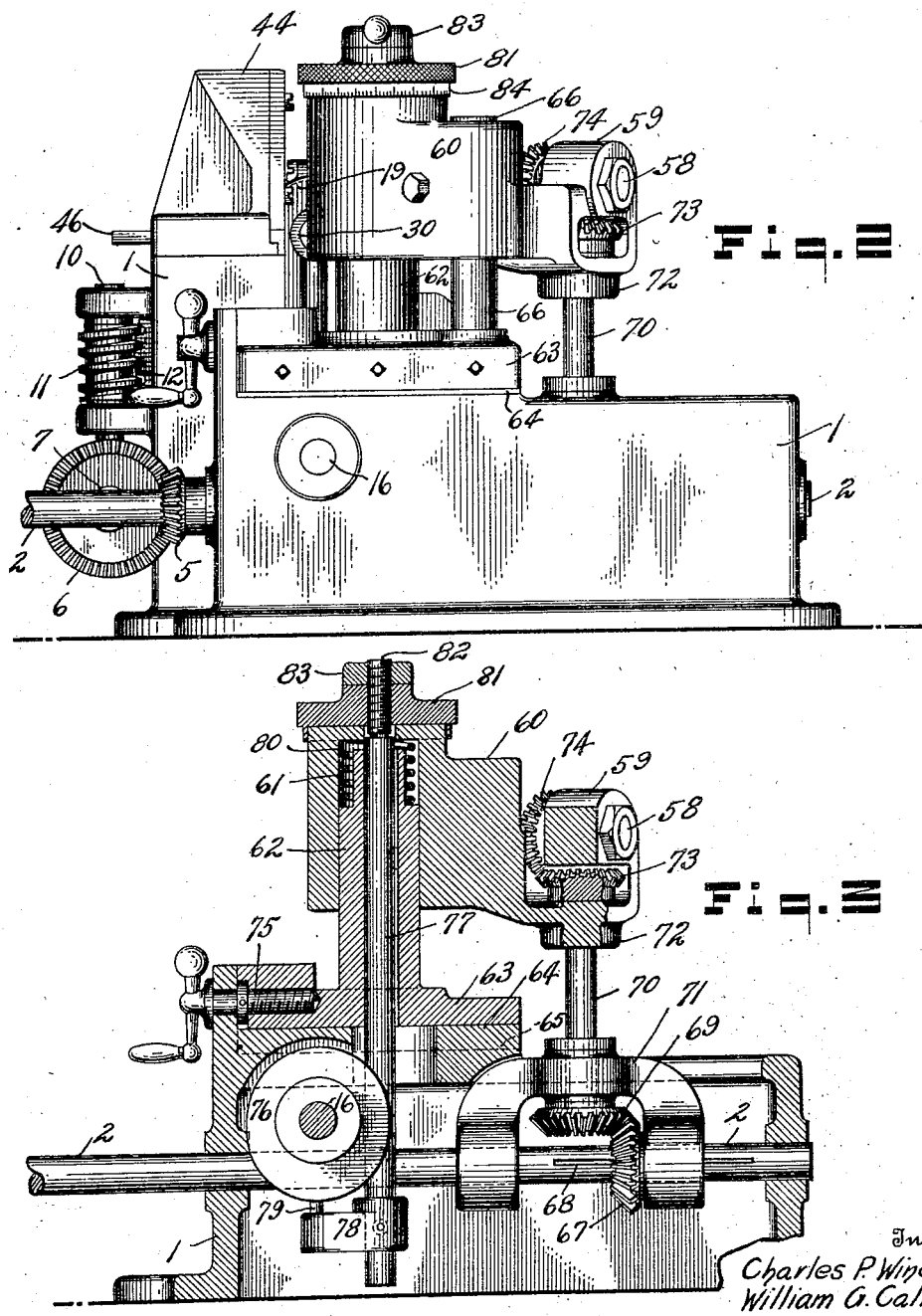

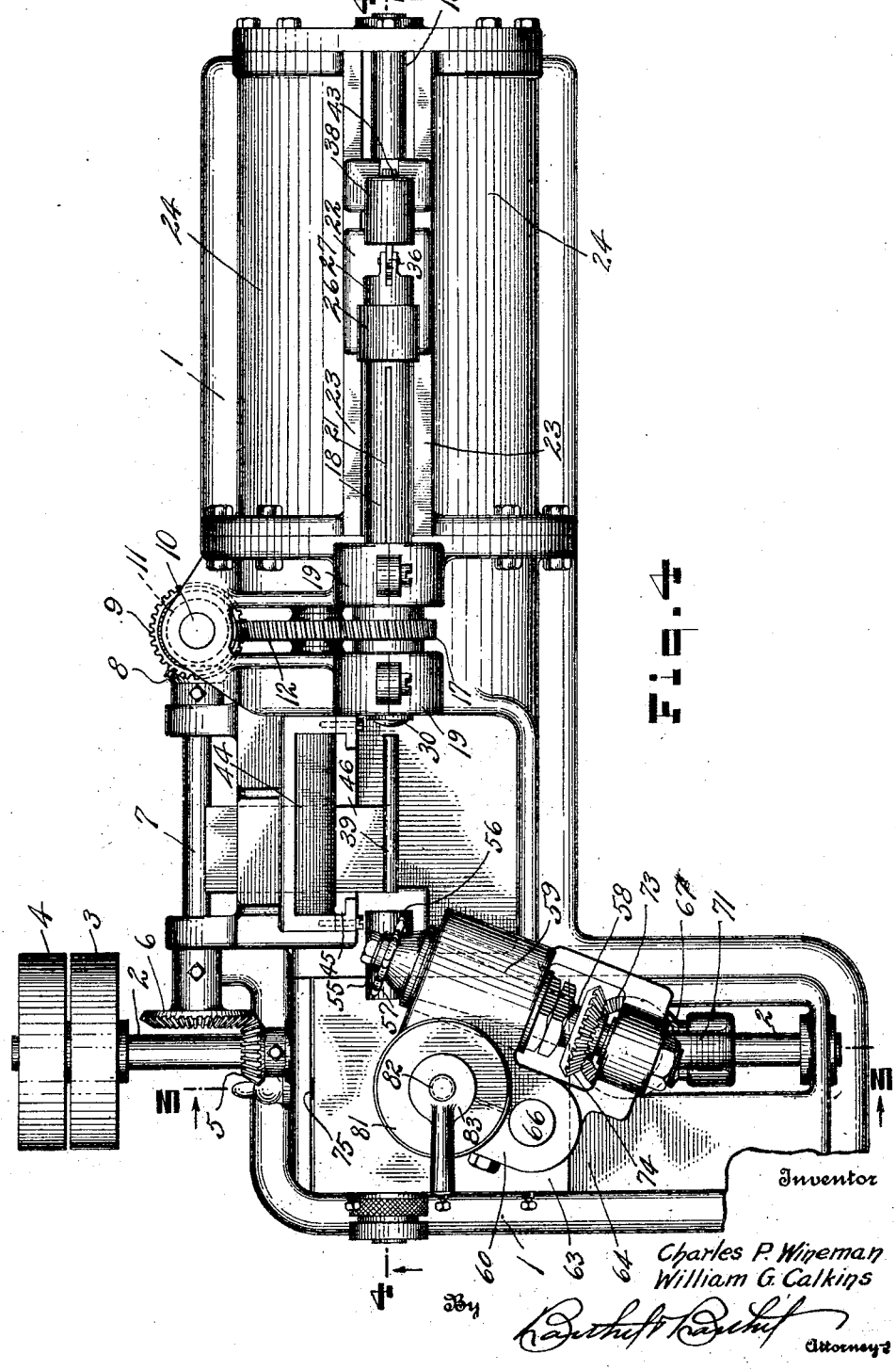

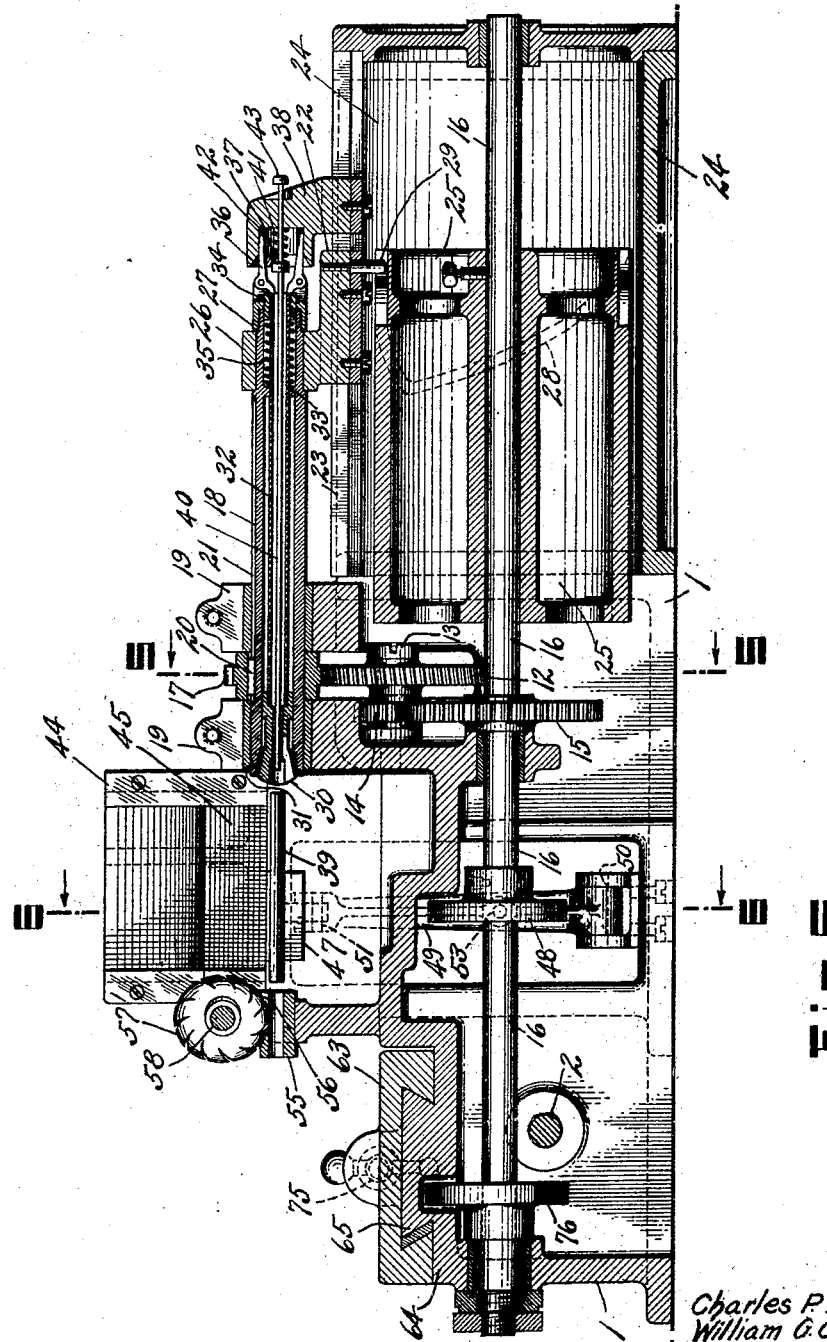

Inventor
Charles P. Wineman
William G. Calkins

June 9, 1925. 1,541,549

C. P. WINEMAN ET AL

AUTOMATIC DRILL MILLING MACHINE

Filed March 29, 1922    6 Sheets-Sheet 6

Inventor
Charles P. Wineman
William G. Calkins
By
Attorneys

Patented June 9, 1925.

1,541,549

UNITED STATES PATENT OFFICE.

CHARLES P. WINEMAN AND WILLIAM G. CALKINS, OF DETROIT, MICHIGAN, ASSIGNORS TO DETROIT TWIST DRILL COMPANY, OF DETROIT, MICHIGAN, A CORPORATION OF MICHIGAN.

AUTOMATIC DRILL-MILLING MACHINE.

Application filed March 29, 1922. Serial No. 547,658.

*To all whom it may concern:*

Be it known that we, CHARLES P. WINEMAN and WILLIAM G. CALKINS, citizens of the United States of America, residing at Detroit, in the county of Wayne and State of Michigan, have invented certain new and useful Improvements in Automatic Drill-Milling Machines, of which the following is a specification, reference being had therein to the accompanying drawings.

This invention relates to a machine for manufacturing twist drills and the like, and its object is to provide a machine adapted to automatically perform the flute milling operation, including the feeding of the blank and the ejectment of the milled blank, continuously and with a positive and accurate timed relation of the several steps in the operation.

A further object is to facilitate changes necessary in manufacturing drills of various sizes and lengths, and to insure accuracy and uniformity of the product. It is also an object to provide a machine which is comparatively simple in construction, compact in its arrangement, and which embodies certain other new and useful features, all as hereinafter more fully described.

With the above and other ends in view, the invention consists in the matters hereinafter set forth and more particularly pointed out in the appended claims, reference being had to the accompanying drawings, in which—

Fig. 1 is a side elevation of a machine embodying the invention;

Fig. 2 an end elevation of the same;

Fig. 3 a transverse section substantially upon the line 3—3 of Fig. 4;

Fig. 4 is a plan view;

Fig. 5 is a longitudinal vertical section substantially upon the line 4—4 of Fig. 4;

Figure 6:
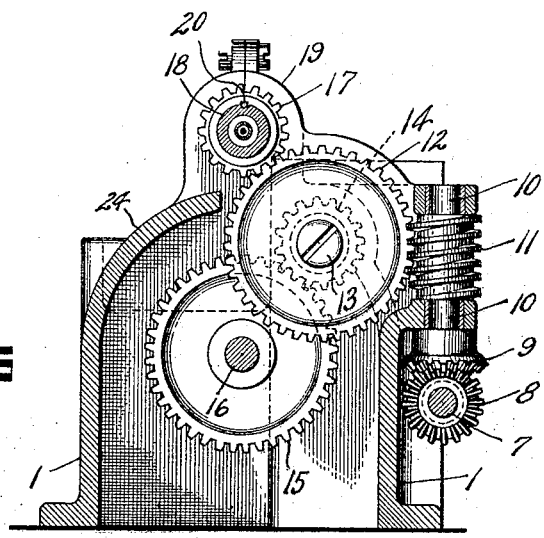
Fig. 6 is a transverse section upon the line 5—5 of Fig. 5.
Figure 7:
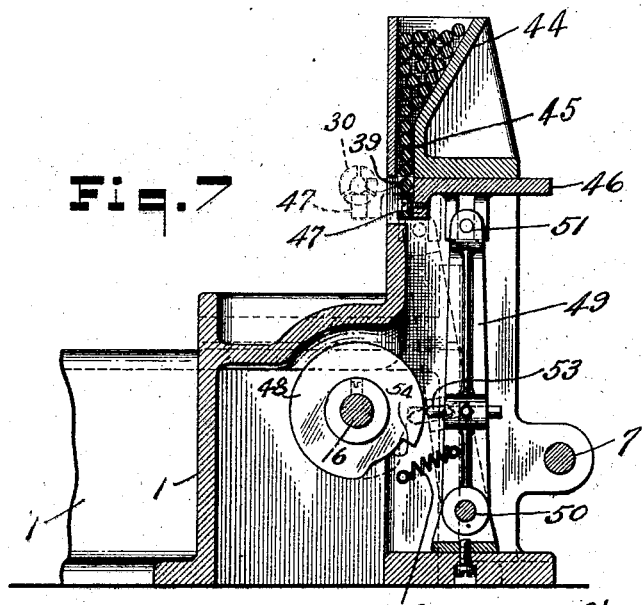

Fig. 7 a transverse section on the line 6—6 of Fig. 5, and

Figure 8:
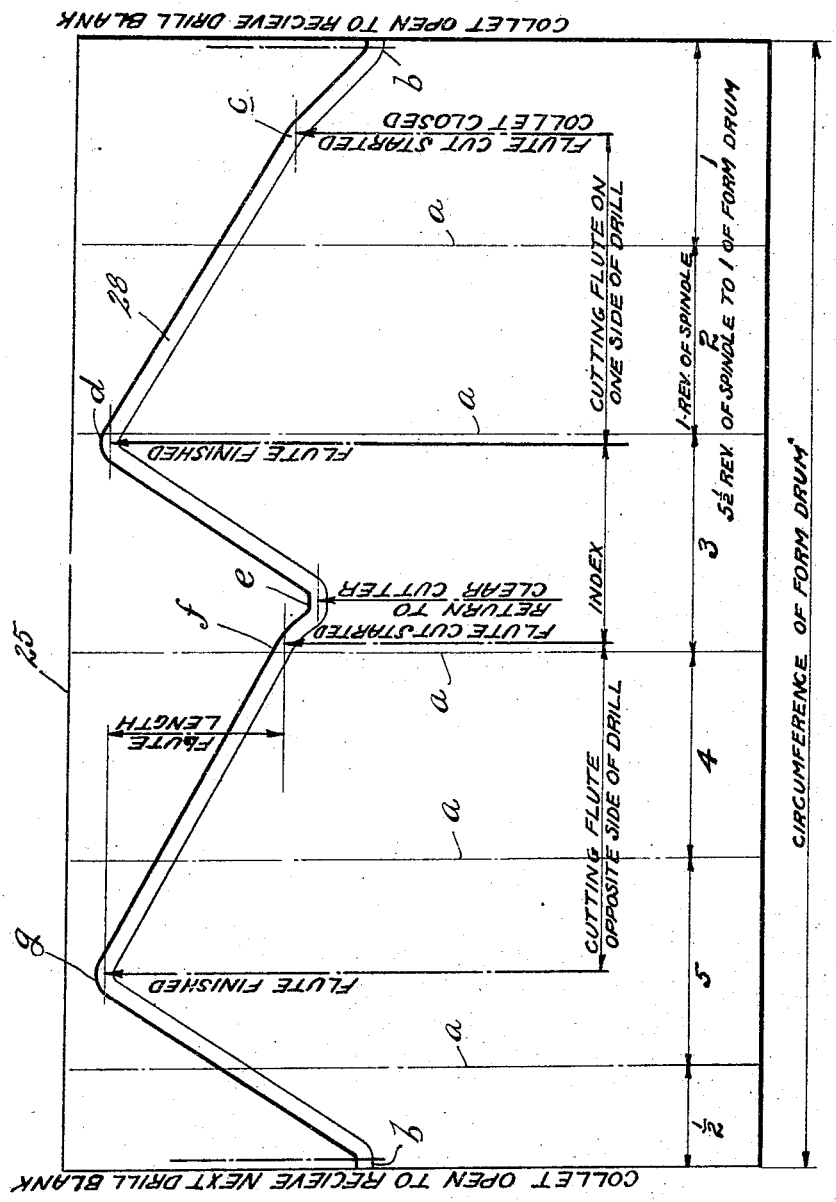

Fig. 8 a developed view or diagram of a master cam or drum.

As shown in the drawings, 1 indicates a suitable supporting base or frame which is provided with suitable bearings for a main drive shaft 2, said drive shaft being provided with a tight pulley 3 and a loose pulley 4 for a driving belt. Secured upon the main drive shaft 2 is a beveled pinion 5 in mesh with a beveled gear 6 secured upon the end of a countershaft 7, said countershaft being mounted in suitable bearings upon one side of the frame and extending longitudinally of the frame at right angles to the main driving shaft. Upon the end of the countershaft 7 opposite that to which the gear 6 is secured, is a beveled pinion 8 which is in mesh with a like pinion 9 secured upon the lower end of a vertical worm shaft 10 also mounted in bearings upon the frame 1 and extending vertically upward to transmit motion from the countershaft through a worm 11 on the worm shaft to a large worm gear 12 mounted upon a stub shaft 13 near the top of the frame 1, said stub shaft 13 being provided with a spur gear 14 in mesh with a large spur gear 15 secured upon a drum shaft 16 which is mounted in suitable bearings upon the frame and extends longitudinally of the machine from end to end thereof and at right angles to the main driving shaft 2. Motion is taken from the large worm wheel 12 through a small worm gear 17 for driving a spindle 18 which is mounted within two parallel spaced bearings 19 on the frame directly above the drum shaft 16. This spindle is mounted within the bearings 19 to freely turn therein and to move longitudinally therethrough, the worm wheel 17 being mounted upon the spindle between said bearings, which bearings hold the worm wheel against movement longitudinally upon the spindle, and driving connection between the wheel and spindle is afforded through a suitable spline or key 20 adapted to slide within a longitudinal groove in the spindle. The spindle is therefore rotated by motion transmitted from the main driving shaft 2 through the countershaft 7, vertical shaft 10, and worm wheel connection, being at the same time free to move longitudinally.

To move the spindle 18 longitudinally in its bearings 19, a head or slide 22 is mounted within ways 23 provided at the upper side of a suitable drum casing 24 which casing forms an extension of the frame 1 and is of semi-cylindrical form to conform somewhat to the shape of a master cam or drum 25 mounted upon the drum shaft 16 within the casing. The ways 23 extend longitudinally of the casing 24 and drum and drum shaft therein, the spindle 18 therefore also extending longitudinally of the drum and drum shaft and vertically above the drum shaft. The head or slide 22 is formed with a bearing 26 to receive the formed rear end of the spindle 18, said spindle being reduced in diameter to pass through the bearing in which it is adapted to turn freely but is held against longitudinal movement within the bearing 26 by means of a cap 27 upon the rear end of the spindle.

Motion is transmitted to the drum shaft 16 from the main driving shaft 2 through the countershaft 7, vertical shaft 10, and worm gears and spur gears 14 and 15. To turn the master cam or drum 25 in timed relation to the other parts of the machine hereinafter described, and to reciprocate the spindle 18 also in timed relation to the other movements of the machine, a cam slot 28, shown in Figs. 5 and 8 of the drawings, is formed in the surface of the drum 25 and engaging this cam slot is a pin or stud 29 secured in any suitable manner to the slide 22 and projecting downwardly therefrom through the slot in the casing 24 between the ways 23. The rotation of the drum therefore imparts an irregular motion hereinafter more fully described in connection with Fig. 8 of the drawings, to move the slide 22 in the ways and reciprocate the spindle 18 longitudinally.

The spindle 18 is tubular and within its forward end is located a suitable blank holding or gripping device or chuck 30 of the usual split head construction, said head being formed conical to fit within the tapered bore 31 of the forward end of the spindle 18. A small tube 32 extends longitudinally through the spindle 18 with the forward end of said tube secured to the inner end of the chuck head 30 and sleeved upon the rear end of this tube 32 between a bearing 33 within the spindle for the tube and a bushing 34 secured upon the rear end of the tube, is a coiled spring 35 arranged to normally exert a force to move the tube 32 longitudinally within the spindle 18 and bring the chuck 30 to seat within the end 31 of the spindle. In order to move the tube 32 longitudinally against the action of the spring 35 and thus project the chuck from the spindle, in order to release the blank caught within the chuck, suitable dogs or fingers 36 are pivotally attached to the collar 27 on the rear end of the spindle 18 and these dogs are formed with short arms to engage the end of the tube 32 or collar 34 thereon, and with long arms adapted to be received within a recess 37 provided within a fixed block 38 secured within the slot in the top of the casing 24 between the ways 23. This recess 37 is of such diameter relative to the pivotal points of the dogs 36 that when the slide 22 is moved to its rearmost position and the spindle is carried thereby toward the block 38, the long arms of the dogs or bell cranks 36 will enter this recess 37 and be turned upon their pivots thereby, swinging the short arms of the dogs or bell cranks forwardly against the rear end of the tube 32 and moving said tube longitudinally against the action of the spring 35. The drill blank 39 which may at the time be gripped at its rear end by the chuck 30, will thus be released by the endwise movement of the tube 32 and chuck head and upon such release, to eject the blank from the chuck, an ejector rod 40 is provided, said rod extending axially through the tube 32 and through an axial bore in the chuck head with its forward end in engagement with the inner end of the drill blank 39 held by the chuck and to move this rod longitudinally for the purpose of forcibly and quickly ejecting the blank, a coiled spring 41 is sleeved upon the rod within the chamber 37 of the block 38 between the inner end of the chamber and a suitable collar 42 secured upon the rod, said rod having a bearing at its rear end upon the block 38 by said block being formed with a bore through which the rear end of the rod extends and is free to reciprocate. The longitudinal movement of the rod is limited by providing a head 43 upon the extreme rear end of the rod to engage the rear side of the block 38. When the spindle 18 is moved toward the block 38 to the position shown in Fig. 5, and with a drill blank gripped and held by the chuck 30, such movement of the spindle toward the block will bring the forward end of the rod 40 into engagement with the inner end of the blank and thus the rod will be moved endwise against the action of the spring 41, compressing said spring slightly so that immediately upon the release of the blank by the opening of the chuck, this spring will act to forcibly and quickly move the rod endwise and eject the blank from the chuck.

To automatically feed drill blanks 39 to the chuck 30 in timed relation to the other steps in the operation of the machine, a hopper 44 is provided within which hopper is placed a supply of blanks and through the throat 45 of this hopper the blanks pass downwardly onto a slide 46 which is reciprocable beneath the hopper, the forward end of said slide being provided with a suitable fixed bar 47 positioned directly below the hopper throat when the slide is in retracted position and spaced from the lower end of the throat a distance equal to the diameter of one blank. To hold the blank in position upon this bar during the movement of the slide, said bar is preferably magnetized to form a permanent magnet and therefore, upon forward movement of the slide from the position shown in Fig. 7, one blank will be carried forward by the slide to a position directly in line with the mouth of the chuck 30. The movement of the slide 46 is in accurate timed relation to the longitudinal movement of the spindle 18 and these movements are so timed that when the spindle has been retracted and a finished drill has been ejected therefrom, as previously described, upon the spindle being again moved forward, the adjacent end of the blank will enter the chuck. The long arms of the dogs 36 are of such a length relative to the necessary forward movement of the spindle in order to carry the chuck a sufficient distance to fully enter the end of the blank therein, that said blank will be fully entered in the chuck before the forward movement of the spindle has withdrawn the long arms of the dogs from their recess 37, and therefore the chuck will be held open until the blank is in position therein when a further forward movement of the spindle will release the dogs or bell cranks 36 and the chuck will be closed by the action of the spring 35 to firmly grip the drill blank.

This timed relation between the operation of the slide 46 and the reciprocation of the spindle 18 is secured through the mounting of a cam wheel 48 upon the drum shaft 16, said cam wheel being provided to swing an operating lever 49 upon its pivot 50, the upper end of said lever being pivotally connected at 51 to the underside of the slide 46, a spring 52 serving to hold the arm 49 turned toward the cam and to hold a pin 53 carried by the arm in firm engagement with the periphery of the cam wheel, which periphery is formed with a cam notch 54 therein, said notch being formed with an abrupt shoulder at its forward end in the direction of rotation, so that the pin will drop off into the notch and permit the arm 49 to be swung quickly toward the cam by the action of the spring 52 at exactly the proper time to feed a drill blank into position in alignment with the chuck 30. The notch 54 is elongated with its bottom formed concentric with the axis of the cam so that the slide 46 will remain in forward position for a sufficient length of time to support and hold the blank while the chuck is being moved up and operated to grip the end of the blank. Because of the particular timing relation between reciprocation of the spindle 18 and rotation of the shaft 16, and as such reciprocation of the spindle is controlled by the master cam or drum 25 which is mounted upon the shaft 16 and the operation of the feed slide 26 is also controlled by the cam wheel 48 upon said shaft, these operations are in accurate timed relation.

After the spindle 18 has moved forwardly and the chuck carried thereby has gripped the end of a blank, further forward movement of the spindle carries the blank endwise into a holding block 55 which is provided with a bore to receive the blank, said block being supported in any suitable manner upon the frame 1 with its bore in accurate longitudinal alignment with the axis of rotation of the spindle and its chuck. The upper side of the block 55 is notched or cut away, as indicated at 56 in Fig. 5, to permit the periphery of a suitable milling cutter 57 to enter the bore of the block and cut the desired depth of groove in the blank as said blank is moved forwardly through the bore of the block by the movement of the spindle 18. During this forward movement of the blank by the spindle, the spindle is being rotated in timed relation to its reciprocation by means of the worm gears 12 and 17, as previously described, and therefore a groove of the desired spiral form is cut in the surface of the blank longitudinally thereof.

The cutter 57 is mounted upon an arbor 58, which arbor is mounted within a suitable bearing 59 on a carrying head 60, said carrying head being provided with a bore 61 to receive a stud 62 extending vertically upward from a slide 63 mounted upon a bed 64 provided therefor on the frame 1 and held in position and free to be reciprocated upon said bed transversely of the frame by means of a rib 65 having under-cut side edges, said rib engaging a dove-tailed groove in the under side of the slide 63. The head 60 is also supported by a vertical post 66 extending vertically upward from the slide 63, said post extending through a vertical bore in a lateral extension of the head. The head is thus supported and carried by the slide 63 with the horizontally extending arbor 58 so positioned that the plane of rotation of the milling cutter carried thereby will be at an angle to the axis of the blank which is being grooved, said cutter plane corresponding to the pitch or angle of the spiral groove to be cut in the blank. Motion is transmitted to the arbor 58 from the main driving shaft 2 by mounting a beveled gear 67 upon said shaft to turn therewith and to slide longitudinally thereon, said shaft being provided with a suitable spline 68 or other means affording driving connection between the shaft and gear and permitting the gear to slide upon the shaft, and in mesh with the gear 67 is a like beveled gear 69 upon a vertical shaft 70, said shaft and gear being carried by a suitable yoke 71 having a bearing upon the shaft 2 to slide longitudinally thereon and carry said shaft and gear and the gear 67 with it. A bearing 72 for the upper end of the shaft 70 is provided upon the head 60 and secured upon the upper end of said shaft 70 is a beveled gear 73 in mesh with a like beveled gear 74 secured upon the outer end of the mandrel or stub shaft 58. Motion for driving the milling cutter is therefore transmitted directly from the main driving shaft and the adjustment of this milling cutter relative to a vertical plane passing through the longitudinal axis of the blank which is being grooved, is provided by the mounting of the head carrying the cutter upon the slide 63 and arranging the driving gears 67 and 69 so that they may move along the main driving shaft when the slide 63 is adjusted by means of a suitable adjusting screw 75, the head and cutter carried thereby being thus adjusted transversely of the frame by the movement of the carrying slide 63.

In the manufacture of spiral drills it is the common practice, for the purpose of strength, to form the drill with the web increased in thickness toward the shank of the drill, that is, the spiral grooves are formed with increasingly less depth toward the shank of the drill, and to automatically increase the thickness of the web during the milling of the grooves in the blank, the present machine is provided with a web increase cam 76 which is secured upon the longitudinal drum shaft 16, and to raise and lower the head 60 carrying the milling cutter 57 the very slight distance necessary to give the diminishing cut to the milling cutter as it mills the groove toward the shank of the blank, the post or stud 62 is formed hollow or tubular and a rod 77 is extended upward through this post with its lower end projecting downwardly in the base or frame 1 adjacent the cam 76. Secured upon the lower end of this rod 77 is an arm 78 carrying a pin 79 at its free end to engage the peripheral surface of the cam 76. The upper end of the post or stud 62 is reduced in diameter and upon this reduced end is sleeved a coiled spring 80 in compression between the shoulder on the post formed by reducing the upper end thereof and the inner end of the bore 61 of the head 60. This spring 80 therefore exerts a force to normally raise the head or slide it vertically upward upon the post and thus hold the pin 79 in firm contact with the periphery of the cam 76, said head 60 being provided with a cap 81 which engages the screw-threaded upward end 82 of the rod 77 and rests upon the upper end of the head. A lock nut 83 is provided on the end of the rod 77 to engage the head 80 and lock the same in the position to which it is adjusted, such adjustment being facilitated by providing a flange 84 on the cap 81, which flange is graduated to show the accurate adjustment of the head so that the operator may readily and accurately determine the proper adjustment of the milling cutter relative to the blank to give the desired depth of the groove. As the web increase cam 76 is mounted upon the drum shaft 16, the web increase mechanism is operated in accurate timed relation to the reciprocation of the spindle 18 and the milling operation.

A developed view or diagrammatic layout of the master cam or drum 25 is shown in Fig. 8 of the drawings. The number of revolutions which are made by the spindle during each rotation of the drum is indicated by the dotted lines a and the cam groove 28 is platted as extending transversely to these lines indicating the revolutions of the spindle. It will be understood that each drill blank is to be formed in the usual manner with two spiral grooves and in the present construction one groove is milled during one forward movement of the spindle, the spindle is then indexed around one hundred eighty degrees and the other flute or groove then milled in the blank. The spindle is then returned to its original position, or the position shown in Fig. 5 to discharge the finished product.

Referring to the diagram, when the pin 29 which engages the cam groove and operates to reciprocate the spindle, is at position b the parts will be in the position shown in Fig. 5 and the chuck or collet 30 will be open to receive the blank. As the drum turns and the pin proceeds along the cam slot, the spindle is advanced to enter the blank therein as at position c, the collet is closed, gripping the blank and the blank has been moved endwise sufficiently to bring it into the block 55 beneath the cutter and the flute cutting is started. At position d the blank has been moved endwise the desired distance and the first flute has been milled, the web increase mechanism having operated during this period to raise the head 60 the desired distance to gradually decrease the depth of the flute and the spindle has made one and one-half revolutions, thus giving the desired spiral cut. Between the positions d and e, the spindle is retracted, withdrawing the blank from the block 55 sufficiently to just clear the milling cutter but the spindle is not retracted sufficiently to enter the dogs 36 in the recess 37 of the block 38 and thus release the chuck or collet. During the return movement of the spindle from d to e, the spindle is indexed or turned so that when the milling of the second groove commences at f, said flute will be properly located in the blank relative to the first flute. From position f to g, the second flute is cut, and during this period the web increase mechanism again operates to gradually reduce the depth of the cut as it progresses toward the shank of the blank. From position g, the spindle is again retracted and returned to its original position, as shown in Fig. 5, entering its dogs 36 into their releasing recess, and opening the collet to release the finished drill, the ejecting rod 40 at the same time operating to forcibly eject the drill from the collet. At this point the feed cam 48 operates to project the feed slide 46 forward and feed a new blank in the position to be caught by the collet, and the operation is repeated.

By the present arrangement, blanks are automatically fed into position to be fluted, in accurate timed relation to the reciprocation of the spindle, and the forward movement of the spindle, the rotation thereof, and the formation of the spiral flutes are all operatively connected with the main drive shaft so that a proper timing of the several operations is insured. Further, in the present arrangement of the machine, a very compact structure is secured and while but a single cam groove 28 is shown in the drum 25, yet, it will be understood that any desired number of these cam grooves having any desired configuration to give increasing or constant spiral angle may be provided in the drum to provide for drills of various lengths, and variance in diameter of the drill blanks is provided for by the arrangement of the head 60 carrying the milling cutter. Changes may therefore be quickly made to provide for manufacture of drills of different lengths and diameters.

It is obvious that changes may be made in the specific form, construction, or arrangement of parts, within the scope of the appended claims, without departing from the spirit of the invention, and we do not therefore limit ourselves to the particular construction shown.

Having thus fully described our invention, what we claim is:—

1. In a machine for fluting drill blanks, the combination with a hopper for holding drill blanks, a milling cutter, a chuck to receive and hold a drill blank, means for rotating and moving said chuck to feed the blank held thereby longitudinally across to the cutter and to operate the chuck to open and close the same, feeding means operated in timed relation to the reciprocation and rotation of the chuck, to feed blanks, one at a time, from said hopper laterally into the path of reciprocating movement of said chuck, and means for moving the milling cutter in timed relation to the movement of said chuck in feeding blanks to the cutter, to regulate the depth of flute cut by the cutter.

2. In a machine of the character described, the combination of a milling cutter, a spindle reciprocable toward and from said cutter and adapted to receive and hold drill blanks, means for feeding drill blanks, one at a time, laterally and into the path of reciprocation of said spindle, means for reciprocating and rotating said spindle, and means for operating said feeding means in timed relation to said reciprocation and rotation of said spindle.

3. In a machine of the character described, the combination of a milling cutter, means for rotating the cutter, a guide adjacent said cutter to receive and guide a blank fed endwise to the cutter, a spindle supported in longitudinal alignment with said guide, a blank holding device carried by the spindle, means for continuously rotating the spindle, means operating in timed relation to the rotation of the spindle for reciprocating the spindles endwise, means operating in timed relation to the reciprocation of the spindle for feeding blanks into longitudinal alignment with the spindle and between the spindle and cutter, and means operated by the reciprocation of the spindle for releasing the blank holding means carried thereby to release the blank.

4. In a machine of the character described, the combination of a milling cutter, a movable head upon which the cutter is mounted, a reciprocable spindle, means for feeding drill blanks laterally into the path of said spindle in timed relation to the reciprocation and rotation of the spindle, a master cam member for reciprocating the spindle, a collet carried at one end of the spindle for receiving and holding blanks, means carried by the spindle for releasing the collet to release a blank when the spindle is retracted to the limit of its movement, means for moving the head to vary the depth of cut of the cutter, and means for rotating the spindle and the master cam member in timed relation.

5. In a machine of the character described, the combination of a milling cutter, an adjustable head for carrying and supporting said cutter, a member forming a fixed guide and a support for a drill blank and into which the blank is fed past the cutter, a reciprocable spindle for feeding blanks into said guide member longitudinally past the cutter, means for rotating the spindle, means for reciprocating the spindle in timed relation to its rotation, means operating in timed relation to the rotation and reciprocation of the spindle for moving said head during the reciprocation of said spindle and in timed relation thereto to move the cutter transversely of the blank held by said fixed supporting member and vary the depth of groove cut by the cutter in the blank, means for releasing the blank from the spindle at one end of the reciprocation thereof, and means operating in timed relation to the reciprocation of said spindle for feeding blanks laterally into the path of reciprocating movement of said spindle.

6. In a machine of the character described, the combination with a supporting frame, of a slide extending transversely of the frame, a head carried by the slide, a milling cutter carried by the head, means for rotating the cutter, a member carried by the frame and forming a guide and support for blanks fed to the cutter, a reciprocable spindle, a collet carried by one end of the spindle to receive and hold blanks, a master cam member for reciprocating the spindle, means for rotating the spindle and the master cam member in timed relation to each other, a hopper for drill blanks, feeding means for feeding drill blanks, one at a time, into longitudinal alignment with said spindle between the collet end of the spindle and said guide member for the blanks, and means for operating said feeding means in timed relation to the reciprocation of said spindle.

In testimony whereof we affix our signatures in presence of two witnesses.

CHARLES P. WINEMAN.
WILLIAM G. CALKINS.

Witnesses:
LEWIS E. FLANDERS,
ANNA M. DORR.